United States Patent [19]

Kondo et al.

[11] Patent Number: 5,187,606

[45] Date of Patent: Feb. 16, 1993

[54] SCANNING OPTICAL APPARATUS

[75] Inventors: Kazuyuki Kondo, Kawasaki; Masamichi Tateoka, Yokohama; Takehiko Nakai, Tokyo, all of Japan

[73] Assignee: Canon Kabushiki Kaisha, Tokyo, Japan

[21] Appl. No.: 598,965

[22] Filed: Oct. 17, 1990

[30] Foreign Application Priority Data

Oct. 20, 1989 [JP] Japan .................. 1-274654
Jul. 5, 1990 [JP] Japan .................. 2-178067

[51] Int. Cl.⁵ .............................. G02B 26/08
[52] U.S. Cl. .................. 359/196; 359/206; 359/215
[58] Field of Search ............... 350/6.1–6.91; 359/196–226, 483, 487–490, 495, 618, 629, 636–640; 356/371, 124; 346/108; 250/234–236

[56] References Cited

U.S. PATENT DOCUMENTS

| | | | |
|---|---|---|---|
| 4,084,092 | 4/1978 | Runciman | 350/6.8 |
| 4,198,657 | 4/1980 | Kanamaru | 359/217 |
| 4,284,994 | 8/1981 | Radl | 346/108 |
| 4,458,982 | 7/1984 | Blain et al. | 350/6.7 |
| 4,509,819 | 4/1985 | Sherman et al. | 350/6.7 |
| 4,715,699 | 12/1987 | Morimoto | 359/217 |
| 4,720,632 | 1/1988 | Kaneko | 359/218 |
| 4,733,072 | 3/1988 | Lettington | 350/6.8 |
| 4,960,312 | 10/1990 | Razzaghi | 350/6.7 |
| 4,978,977 | 12/1990 | Ohmori et al. | 359/217 |
| 5,015,096 | 5/1991 | Kowalski et al. | 356/371 |
| 5,044,710 | 9/1991 | Iwai et al. | 250/236 |

FOREIGN PATENT DOCUMENTS

| | | | |
|---|---|---|---|
| 5837616 | 3/1983 | European Pat. Off. | |
| 62-98332 | 5/1987 | Japan | 350/6.8 |
| 1235915 | 9/1989 | Japan | 350/6.7 |
| 1182470 | 9/1985 | U.S.S.R. | 350/6.8 |

Primary Examiner—Bruce Y. Arnold
Assistant Examiner—Thong Nguyen
Attorney, Agent, or Firm—Fitzpatrick, Cella, Harper & Scinto

[57] ABSTRACT

A scanning optical apparatus has a light source for emitting a light beam, and a deflector such as rotatable polygonal mirror having a plurality of mirror surfaces for deflecting the light beam emitted from the light source. Each mirror surface of the rotatable polygonal mirror has a pair of reflecting surfaces inclined toward the center axis of rotation of the polygonal mirror and orthogonal to each other. A fixed reflecting mirror is arranged in opposed relationship with one of the pair of reflecting surfaces so that the light beam deflected by the deflector is reflected to be returned to the deflector again.

28 Claims, 5 Drawing Sheets

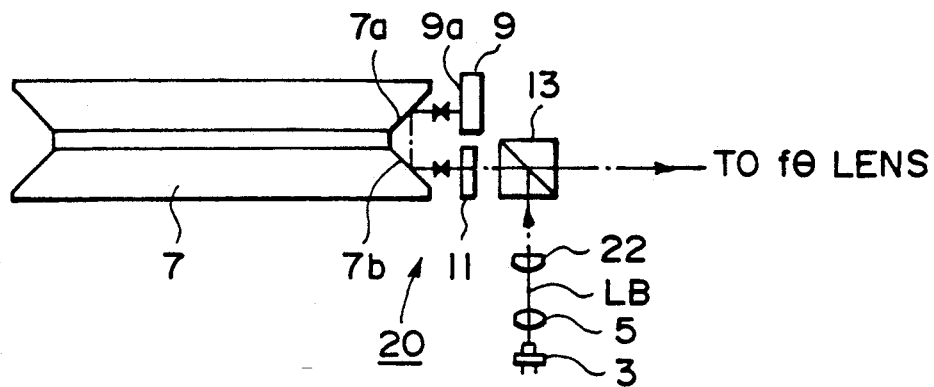
F I G. 5
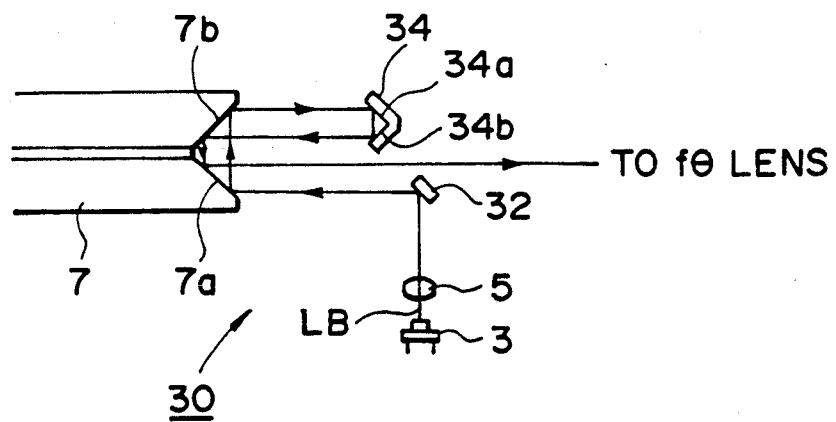
F I G. 6

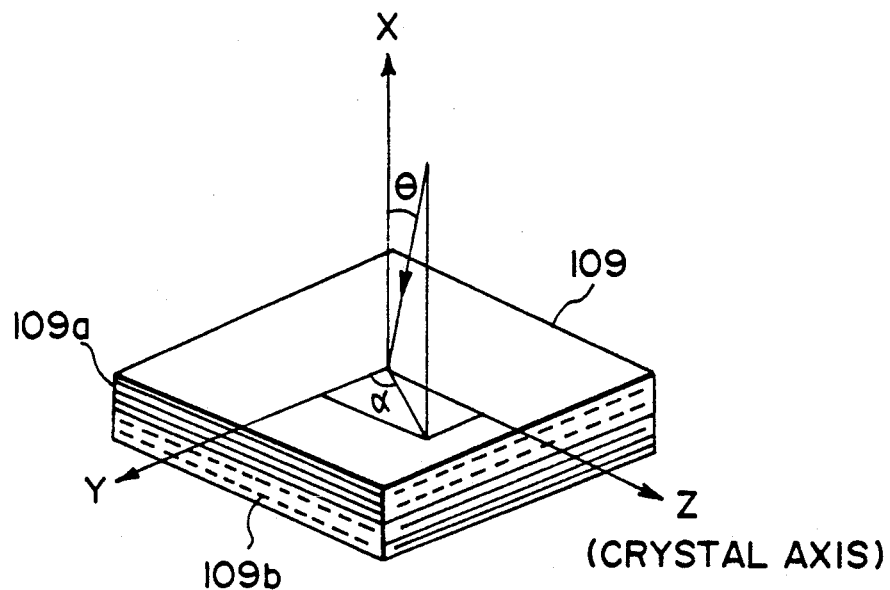
F I G. 9
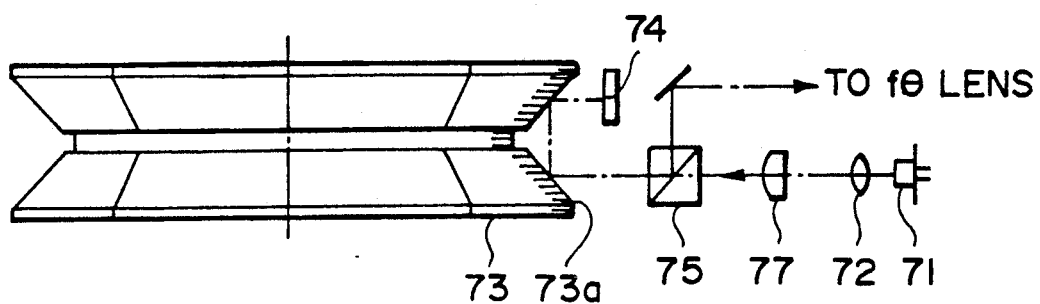
F I G. 10

SCANNING OPTICAL APPARATUS

BACKGROUND AND SUMMARY OF THE INVENTION

This invention relates to a scanning optical apparatus in which a light beam emitted from a light source is reflected by the mirror surface of a rotatable polygonal mirror and thereby deflected and scanned.

As a scanning optical apparatus, there is known one as shown, for example, in FIG. 1 of the accompanying drawings wherein a laser beam LB emitted from a laser source 50 is modulated on the basis of predetermined image information and this modulated beam LB is collimated by a collimator lens 52 and thereafter is reflected by a rotatable polygonal mirror 54 rotated at a uniform speed, whereby the beam LB is scanned in uniform speed circular motion and further the scanning in uniform speed circular motion is converted into scanning in uniform speed rectilinear motion by an f$\theta$ lens 56 and the beam is imaged on a photosensitive drum 58 to thereby record an image.

In a scanning optical apparatus of this kind, it would occur to mind to rotate the rotatable polygonal mirror 54 at a high speed or increase the number of the mirror surfaces of the polygonal mirror 54 in order to scan the beam at a high speed, but scanning at a higher speed has been difficult because in the mechanical structure of a rotating mechanism, there is a limit in the increase in rotational speed or because the increase in the number of the mirror surfaces makes the polygonal mirror 54 bulky.

Therefore, there would occur to mind a scanning optical apparatus as shown in FIG. 2 of the accompanying drawings where a beam LB emitted from a laser source 62 is caused to pass through a collimator lens 64 and impinge on a rotatable polygonal mirror 66 at an angle $\theta$ with respect to a normal N on the mirror surface 66a of the polygonal mirror 66 and the beam LB reflected by the mirror surface 66a is turned back to the polygonal mirror 66 by a fixed reflecting mirror 68 disposed in opposed relationship with the polygonal mirror 66 and is reflected twice by the mirror surface 66a of the polygonal mirror 66 and enters an f$\theta$ lens (not shown).

In this apparatus, the beam is scanned by being reflected twice by the rotatable polygonal mirror 66 and therefore the scanning angle of the laser beam LB is enlarged to twice (when the angle of rotation of the rotatable polygonal mirror is $\theta$, in the case of one reflection, the incident light and the emergent light form an angle of $2\theta$ therebetween, but if the beam is reflected twice by the polygonal mirror, the first incident light and the last emergent light form an angle of $4\theta$ therebetween, and this is simply verified by geometrical optics and consequently, the scanning angle becomes twice as great and thus, the scanning speed of the laser beam LB can be enhanced without the number of the mirror surfaces of the polygonal mirror 66 being increased and without the rotational speed of the polygonal mirror 66 being increased.

Also, the number of the mirror surfaces can be made relatively small and therefore, each mirror surface 66a can be made large and the diameter of the beam can be made large and the diameter of the spot on the photosensitive drum can be made small.

In the above-described apparatus, however, the laser beam LB is caused to impinge on the polygonal mirror 66 at an angle $\theta$ with respect to the normal N to the polygonal mirror 66 and therefore, there arises the problem that as the scanning angle of the laser beam becomes greater, the scanning line on a medium to be scanned becomes curved or the diameter of the laser spot varies.

So, an object of the present invention is to provide a scanning optical apparatus in which, without the apparatus being made bulky, a light beam can be scanned at a high speed and which can obtain a formed image free of distortion.

According to the present invention which achieves the above object, in a scanning optical apparatus a light beam emitted from a light source is reflected by a plurality of mirror surfaces of a rotatable polygonal mirror and thereby deflected and scanned. Each mirror surface of the rotatable polygonal mirror comprises a pair of reflecting surfaces inclined toward the center axis of rotation of the rotatable polygonal mirror and orthogonal to each other. In opposed relationship with one of said pair of reflecting surfaces, there is fixed a reflecting mirror having at least one reflecting surface for reflecting the light beam from said one reflecting surface back to the reflecting surface of the polygonal mirror.

Specifically, the fixed reflecting mirror may be a plane mirror having a reflecting surface or a roof type reflecting mirror, and the light beam is directed from the light source to the rotatable polygonal mirror through the intermediary of a reflecting mirror or a polarizing beam splitter and a $\lambda/4$ plate.

BRIEF DESCRIPTION OF THE DRAWINGS

FIG. 5 is a view showing the construction of a second embodiment of the scanning optical apparatus of the present invention in the cross-section thereof in the sub-scanning direction.

FIG. 6 is a view showing the construction of a third embodiment of the scanning optical apparatus of the present invention in the cross-section thereof in the sub-scanning direction.

FIG. 9 shows the construction of a quarter wavelength plate shown in FIG. 7.

FIG. 10 is a view showing the construction of a fifth embodiment of the scanning optical apparatus of the present invention in the cross-section thereof in the sub-scanning direction.

DESCRIPTION OF THE PREFERRED EMBODIMENTS

Some embodiments of the present invention will hereinafter be described with reference to the drawings.

Figure 3:
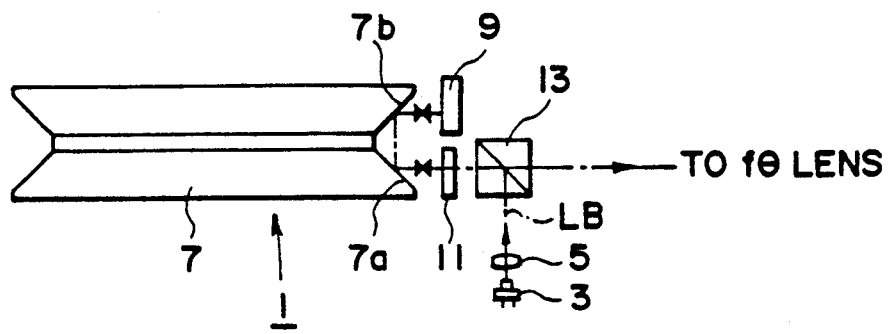
FIG. 3 is a view showing the construction of a first embodiment of the scanning optical apparatus of the present invention in the cross-section thereof in the sub-scanning direction.
Figure 4:
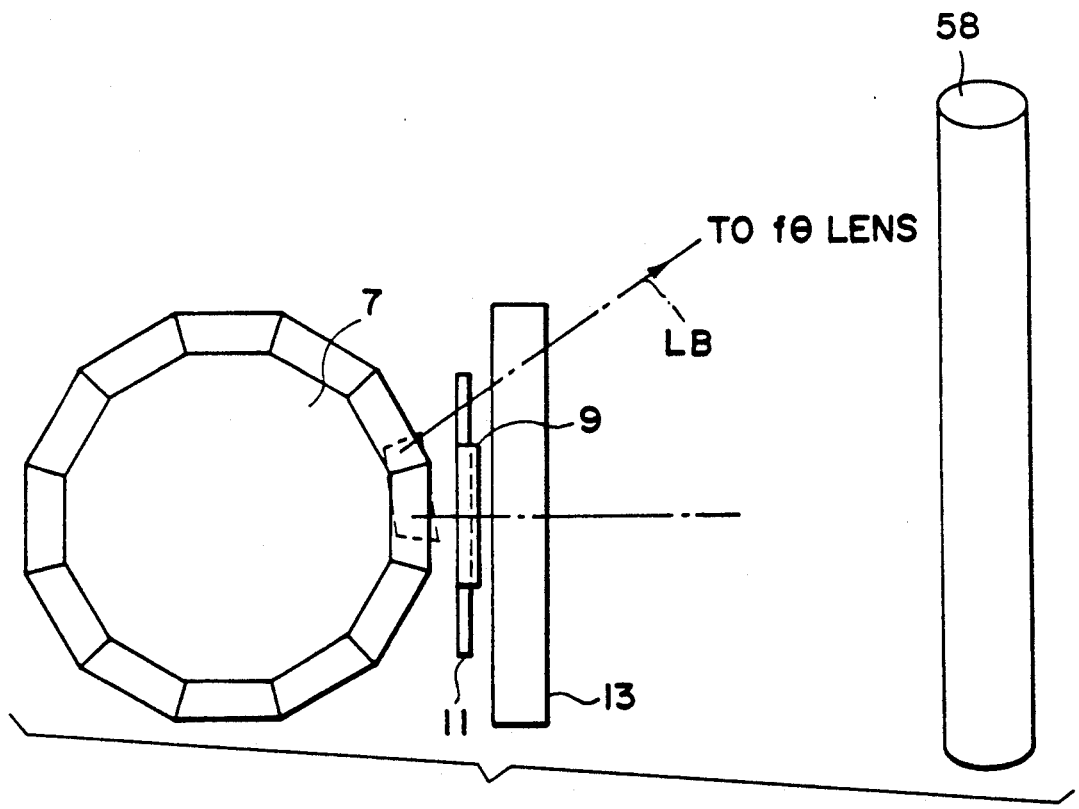
FIG. 4 is a view of the same embodiment in the scanning cross-section thereof.

A first embodiment of the scanning optical apparatus of the present invention will first be described. FIG. 3 is a front view of the first embodiment (a view in the cross-section thereof in the sub-scanning direction), and FIG. 4 is a plan view thereof (a view in the scanning cross section).

The scanning cross-section refers to a light beam surface in which a light beam is deflected and scanned by the deflecting reflecting surface of a rotatable polygonal mirror. The sub-scanning cross-section refers to a cross-section perpendicular to the scanning cross-section and containing the optic axis of an fθ lens.

As shown, the scanning optical apparatus 1 comprises chiefly a semiconductor laser 3 as a light source emitting a laser beam LB, a collimator lens 5 for collimating the laser beam LB incident from the semiconductor laser 3, a roof type rotatable polygonal mirror 7 having a plurality of pairs of mirror surfaces each formed by two reflecting surfaces 7a and 7b inclined inwardly and orthogonal to each other, a fixed reflecting mirror 9 disposed in opposed relationship with the reflecting surface 7b and comprising a plane mirror, a quarter wavelength plate (λ/4 plate) 11 disposed in opposed relationship with the reflecting surface 7a and delaying the phase by $\pi/2$ depending on the direction of polarization of the incident laser beam, and a polarizing beam splitter 13 disposed opposite to the roof type rotatable polygonal mirror 7 with the λ/4 plate 11 interposed therebetween.

In this scanning optical apparatus 1, the laser beam LB emitted from the semiconductor laser 3, when passed through the collimator lens 5, travels as parallel light, is reflected by the polarizing beam splitter 13 and passes through the λ/4 plate 11. At this time, the laser beam LB is made into rectilinearly polarized light by the polarizing beam splitter 13 and further converted into circularly polarized light by the λ/4 plate 11.

Then, the laser beam LB impinges on one reflecting surface 7a of the roof type rotatable polygonal mirror 7 and is reflected thereby and impinges on the other reflecting surface 7b and is further reflected thereby, whereby the laser beam travels in the direction opposite to the direction in which it impinges on one reflecting surface 7a (in the cross-section of FIG. 3, the incident light onto the reflecting surface 7a and the reflected light from the reflecting surface 7b are parallel to each other). Thereupon, the laser beam is reflected back by the fixed reflecting mirror 9 disposed so as to intersect the direction of travel of the laser beam and again impinges on said reflecting surface 7b (in the cross-section of FIG. 3, the reflected light from the reflecting surface 7b and the re-incident light onto the reflecting surface 7b are on the same optical path), and again passes through the λ/4 plate 11, following the optical path of the reflecting surface 7b→the reflecting surface 7a→the λ/4 plate 11 (in the cross-section of FIG. 3, the incident light onto the reflecting surface 7a and the re-reflected light from the reflecting surface 7a assume the same optical path). At this time, the laser beam which is circularly polarized light is converted into rectilinearly polarized light whose plane of polarization is perpendicular to the rectilinearly polarized light during incidence, and now passes rectilinearly through the polarizing beam splitter 13, and passes through an fθ lens (not shown) which constitutes an optical system for condensing the laser beam, and is imaged on a photosensitive drum (not shown) which is a surface to be scanned. In this manner, the light beam from the light source and the light beam from the deflector are separated from each other by the use of the λ/4 plate and the polarizing beam splitter.

At this time, as shown in FIG. 4, the roof type rotatable polygonal mirror 7 is rotated, whereby the beam LB transmitted through the polarizing beam splitter 13 is scanned in the scanning cross-section by uniform speed circular motion, and is converted into uniform speed rectilinear motion by the fθ lens and scanned on the photosensitive drum.

Figure 1:
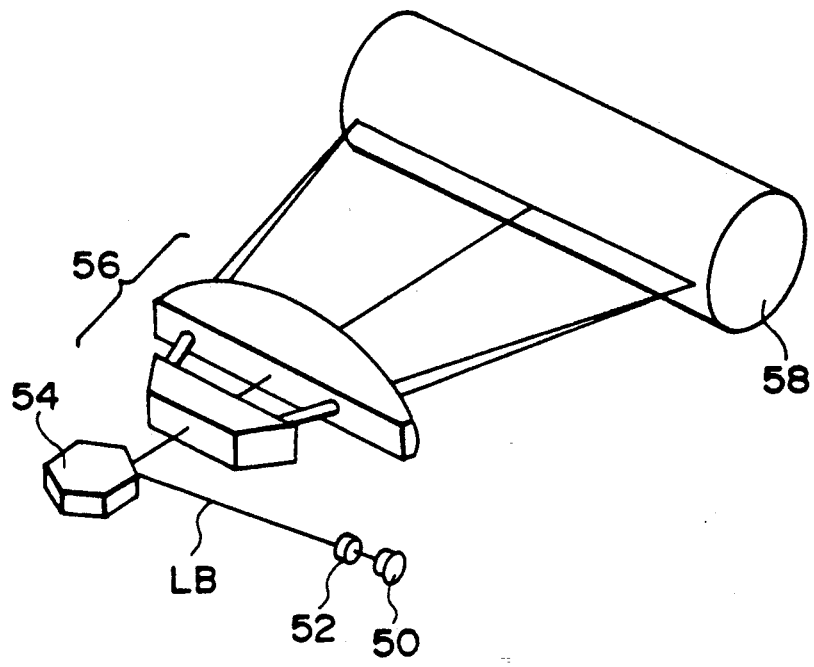
FIG. 1 is a perspective view of an example of the scanning optical apparatus according to the prior art.

As described above, in the first embodiment, the fixed reflecting mirror 9 is disposed in opposed relationship with one reflecting surface 7b of the roof type rotatable polygonal mirror 7 and the beam LB reflected by the two reflecting surfaces 7a and 7b of the roof type rotatable polygonal mirror 7 and impinging on the fixed reflecting mirror 9 is turned back by the fixed reflecting mirror 9 so as to be again reflected by the two reflecting surfaces 7a and 7b and therefore, the scanning angle of the laser beam LB widens to twice as compared with that in the example of the prior art shown in FIG. 1. Thus, the roof type rotatable polygonal mirror 7 can be made small in its outer diameter and compact and therefore, high-speed rotation of the roof type rotatable polygon mirror 7 becomes possible and high-speed scanning of the beam LB becomes possible. Or it is possible to increase the number of mirror surfaces even for the same size of the roof type rotatable polygonal mirror, and it becomes possible to scan the beam LB at a higher speed without increasing the rotational speed of the polygonal mirror.

Figure 2:
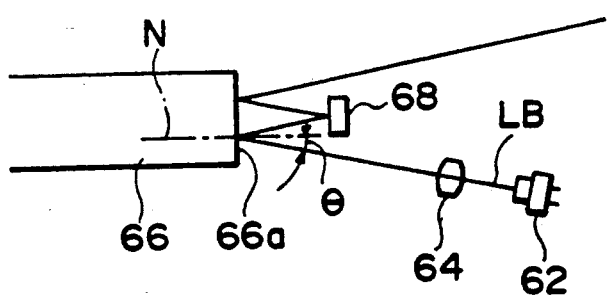
FIG. 2 is a cross-sectional view showing another example of the scanning optical apparatus according to the prior art.

Also, in the first embodiment, a plane mirror of one-piece construction is employed as the fixed reflecting mirror 9 and the polarizing beam splitter 13 is disposed on the side opposite to the roof type rotational polygonal mirror 7 with the λ/4 plate 11 interposed therebetween, whereby the light beam produced from the semiconductor laser 3 can be used efficiently and design is made such that the forward path of the polarizing beam splitter 13→the roof type rotatable polygonal mirror 7→the fixed reflecting mirror 9 and the backward path of the fixed reflecting mirror 9→the roof type rotatable polygonal mirror 7→the polarizing beam splitter 13 (→the fθ lens) assume the same optical path in the cross-section in the sub-scanning direction shown in FIG. 3 and therefore, the curvature of the scanning line resulting from the widening of the scanning angle of the beam and the fluctuation of the spot diameter of the beam LB do not occur as do in the example shown in FIG. 2. Therefore, the reflecting surfaces 7a and 7b can be made large enough and the F-number of the beam can be made small enough to thereby made the diameter of the spot on the photosensitive drum small enough. Thus, images of high quality can be recorded on the photosensitive drum.

A scanning optical apparatus 20 according to a second embodiment will now be described. FIG. 5 shows the construction of the second embodiment in the cross-section thereof in the sub-scanning direction.

As shown in FIG. 5, the construction of the scanning optical apparatus 20 is such that a cylindrical lens 22 disposed between the collimator lens 5 and the polarizing beam splitter 13 is added to the same optical construction as the first embodiment.

This cylindrical lens 22 has power only in the sub-scanning direction which is a direction perpendicular to the scanning cross-section, and causes a parallel light beam LB incident from the collimator lens 5 to be imaged in the form of a line on the fixed reflecting mirror 9. Also, the fixed reflecting mirror 9 and the imaging surface on the photosensitive drum are in a conjugate relationship with each other in the cross-section in the sub-scanning direction by an f$\theta$ lens being disposed between the two. Therefore, even if the reflecting surface 9a of the fixed reflecting mirror 9 is not orthogonal to the incident laser beam LB in the cross-section in the sub-scanning direction and has more or less angle error, the pitch irregularity on the imaging surface of the photosensitive drum and the bending of the scanning line can be corrected.

A scanning optical apparatus 30 according to a third embodiment will now be described. FIG. 6 shows the construction of the third embodiment in the cross-section in the sub-scanning direction.

In FIG. 6, the construction of the scanning optical apparatus 30 is the same as that of the first embodiment with respect to the semiconductor laser 3, the collimator lens 5 and the roof type rotatable polygonal mirror 7, but instead of the polarizing beam splitter in the first embodiment, a plane reflecting mirror 32 is disposed at an angle of 45° with respect to the beam LB rectilinearly travelling from the collimator lens 5, and in place of the fixed reflecting mirror comprising a plane mirror, there is disposed a roof type fixed reflecting mirror 34 having two reflecting surfaces 34a and 34b orthogonal to each other.

In this scanning optical apparatus 30, the light beam LB from the semiconductor laser 3, when transmitted through the collimator lens 5, travels as a parallel light beam, is reflected at a right angle by the plane reflecting mirror 32, impinges on one reflecting surface 7a of the roof type rotatable polygonal mirror 7, is reflected by the reflecting surface 7a and impinges on the other reflecting surface 7b and is further reflected thereby, whereby it travels in the direction just opposite in the cross-section in the sub-scanning direction to the direction in which it has impinged on said one reflecting surface 7a. Thereupon, the laser beam LB is reflected by the two reflecting surfaces 34a and 34b of the roof type fixed reflecting mirror 34 disposed in the direction of travel of the light beam and is turned back, assuming an optical path parallel to the incidence optical path in the cross-section in the sub-scanning direction with a predetermined width (a matter of the reflection points of the reflecting surfaces 34a and 34b). It again impinges on the reflecting surface 7b of the roof type rotatable polygonal mirror 7, and via the optical path of the reflecting surface 7b the reflecting surface 7a, it emerges to an f$\theta$ lens, assuming an optical path parallel to the optical path along which it has impinged from the plane reflecting mirror 32 onto the roof type rotatable polygonal mirror 7 in the cross-section in the sub-scanning direction, but more toward the roof type fixed reflecting mirror 34 by a predetermined width, that is, going through the space between the roof type fixed reflecting mirror 34 and the plane reflecting mirror 32.

The third embodiment is designed such that by the roof type fixed reflecting mirror 34 being disposed in opposed relationship with one reflecting surface 7b of the roof type rotatable polygonal mirror 7, the laser beam LB emerges from the roof type rotatable polygonal mirror 7 onto the f$\theta$ lens, assuming an optical path parallel to the optical path along which the laser beam LB has impinged on the roof type rotatable polygonal mirror 7, but more toward the roof type fixed reflecting mirror 34 by a predetermined width, and therefore the polarizing beam splitter and the $\lambda/4$ plate become unnecessary and the optical system can be simplified.

Also, since the roof type fixed reflecting mirror 34 is employed as the fixed reflecting mirror, it is not necessary to effect the correction of fall by a cylindrical lens as in the second embodiment.

As described above, the scanning optical apparatus of the present invention is a scanning optical apparatus in which a light beam emitted from a light source is reflected by the mirror surfaces of a rotatable polygonal mirror and thereby deflected and scanned and wherein each mirror surface of said rotatable polygonal mirror comprises a pair of reflecting surfaces inclined toward the center of rotation of the rotatable polygonal mirror and orthogonal to each other and a reflecting mirror having at least one reflecting surface for reflecting the light beam from one of the pair of reflecting surfaces and returning said light beam to said one reflecting surface is fixed in opposed relationship with said one reflecting surface.

Thus, design is made such that a fixed reflecting mirror is disposed in opposed relationship with one of the pairs of reflecting surfaces of the rotatable polygonal mirror and the beam which has impinged from said one reflecting surface onto the fixed reflecting surface is turned back and caused to impinge on the rotatable polygonal mirror again, whereby the light beam incident from the light source onto the rotatable polygonal mirror emerges from the rotatable polygonal mirror along an optical path parallel to the incidence optical path in the cross-section in the sub-scanning direction, and therefore it is possible to widen the scanning angle of the light beam to twice and yet prevent the curvature of the scanning line and the fluctuation of the diameter of the imaged spot which would result from the widening of the scanning angle.

Accordingly, the rotatable polygonal mirror can be made compact and high-speed rotation of the rotatable polygonal mirror becomes possible and thus, high-speed scanning of the light beam becomes possible. Or the number of the mirror surfaces of the rotatable polygonal mirror can be increased even for the same size of the rotatable polygonal mirror, and higher-speed scanning of the light beam becomes possible without the rotational speed of the rotatable polygonal mirror being increased.

Also, the reflecting surfaces of the polygonal mirror can be made relatively large and therefore, the F-number of the beam can be made small and the diameter of the imaged spot of the light beam can be made small enough, and images of high quality can be recorded.

A further embodiment of the present invention will hereinafter be described.

Figure 7:
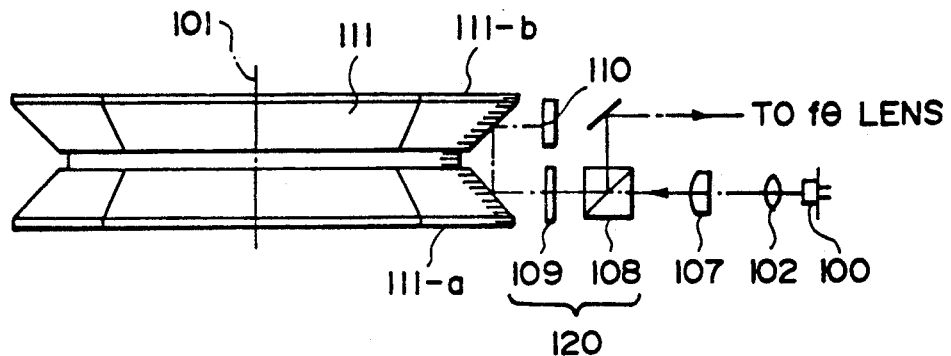
FIG. 7 is a view showing the construction of a fourth embodiment of the scanning optical apparatus of the present invention in the cross-section thereof in the sub-scanning direction.
Figure 8:
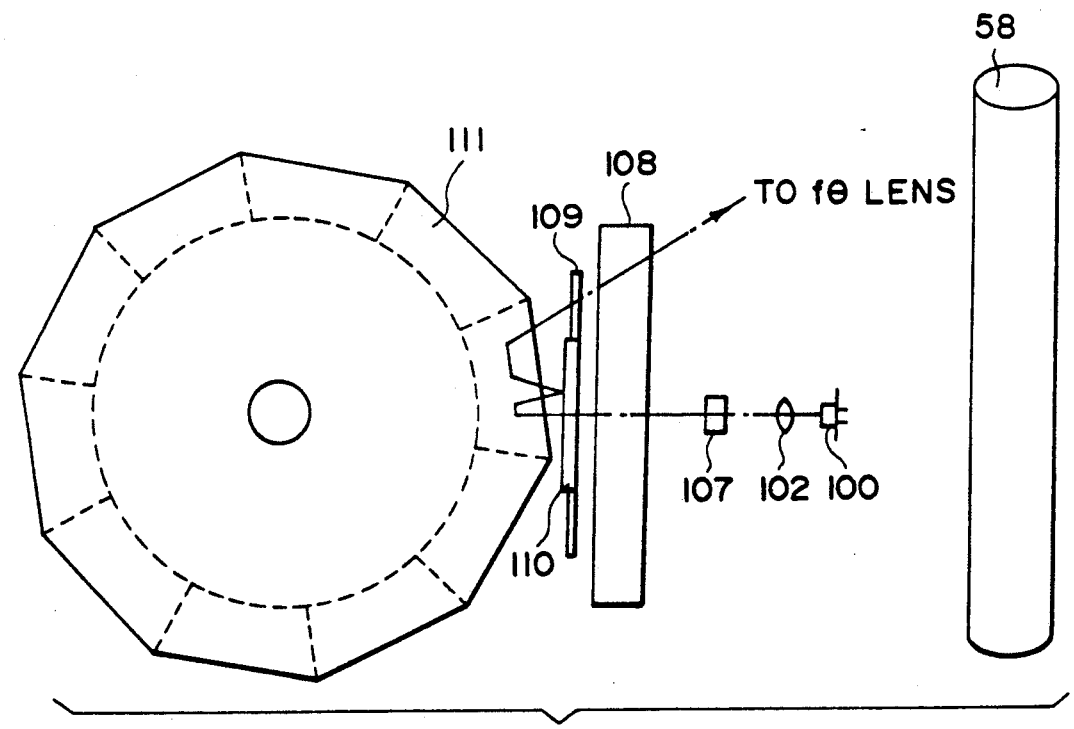
FIG. 8 is a view of the same embodiment in the scanning cross-section thereof.

FIG. 7 shows the state of a fourth embodiment of the scanning optical apparatus of the present invention in the cross-section thereof in the sub-scanning direction, FIG. 8 is a view of the same embodiment in the scanning cross-section thereof, and FIG. 9 shows the construction of a quarter wavelength plate shown in FIG. 7.

In these figures, the reference numeral 100 designates light source means having, for example, a semiconductor laser or a polarizing plate and a light source for emitting predetermined rectilinearly polarized light. In the present embodiment, the light beam emitted from the light source 100 is a rectilinearly polarized beam.

The reference numeral 102 denotes a collimator lens which collimates the light beam emitted from the light source 100. The reference numeral 107 designates a cylindrical lens having predetermined refractive power with respect to the sub-scanning cross-section.

The reference numeral 108 denotes a polarizing beam splitter having the function of separating the incident light beam into two light beams by the use of double-refractive crystal.

The reference numeral 109 designates a quarter wavelength plate formed by a plurality of crystals cemented together in such a manner that their crystal axes are orthogonal to one another and inclinedly disposed so that the crystal axes may form 45° with respect to the scanning direction of the light beam. In the present embodiment, the quarter wavelength plate 109 is formed by two crystal plates 109a and 109b being cemented together. The polarizing beam splitter 108 and the quarter wavelength plate 109 together constitute optical path separating means 120.

The reference numeral 111 denotes a roof type rotatable polygonal mirror comprising a plurality of pairs of reflecting surfaces, each pair comprising two reflecting surfaces 111a and 111b disposed at right angles in opposed relationship with each other, said plurality of pairs of reflecting surfaces being arranged around a rotational axis 101. In the present embodiment, the rotatable polygonal mirror 111 has twenty reflecting surfaces (ten pairs of reflecting surfaces) in total. The reference numeral 110 designates reflecting means comprising a fixed reflecting mirror having at least one reflecting surface. The reflecting means 110 is disposed in opposed relationship with the roof type rotatable polygonal mirror 111.

In the present embodiment, the light beam emitted from the light source 100 is collimated by the collimator lens 102, is condensed in one-dimensional direction (the sub-scanning direction) by the cylindrical lens 107 and enters the polarizing beam splitter 108.

Design is made such that the rectilinearly polarized light beam transmitted through the polarizing beam splitter enters the quarter wavelength plate 109 so that the direction of polarization of said light beam may be 0° or 90° with respect to the crystal axis of the quarter wavelength plate. The rectilinearly polarized light beam is converted into circularly polarized light by passing through the quarter wavelength plate 109 and impinges on the reflecting surface 111a of the roof type rotatable polygonal mirror 111, and is reflected upwardly as viewed in FIG. 7 by the reflecting surface 111a and impinges on the other reflecting surface 111b.

The incident light beam further reflected toward the fixed reflecting mirror 110 by the reflecting surface 111b is reflected by this fixed reflecting mirror 110 and becomes circularly polarized light opposite in direction to the direction during the incidence, and again impinges on the reflecting surface 111b, and emerges from the roof type rotatable polygonal mirror 111 along an optical path converse to that during the aforementioned incidence and again enters the quarter wavelength plate 109.

The emergent light beam is converted into rectilineary polarized light whose plane of polarization is orthogonal to that during the incidence by the quarter wavelength plate 109 and enters the polarizing beam splitter 108, and is reflected upwardly as viewed in FIG. 7 by this polarizing beam splitter 108 and is converged into the form of a spot on the surface of a photosensitive drum by an imaging optical system such as an $f\theta$ lens, not shown. The roof type rotatable polygonal mirror 111 is rotated at a predetermined speed, whereby the surface of the photosensitive drum is optically scanned by the beam.

In the present embodiment, the polarizing beam splitter 108 and the quarter wavelength plate 109 formed by two crystal plates being cemented together are used as the optical path separating means 120 for separating the optical paths of the incident light beam and emergent light beam from each other, whereby the light beam emitted from the light source 100 is efficiently directed to the surface of the photosensitive drum with the loss of the quantity of light of the light beam being reduced.

Description will now be made of the optical action of the quarter wavelength plate 109 which constitutes an element of the optical path separating means 120.

Generally, an optically scanned light beam enters a quarter wavelength plate at an angle. Usually in a wavelength plate formed by a single crystal plate, the plate thickness d is expressed by the following equation:

$$d \cdot \Delta n = (2m+1) \cdot \lambda / 4 \tag{1}$$

where $\lambda$ is the wavelength used, $\Delta n$ is the difference ($\Delta n = n_e - n_o$) between the refractive index ($n_e$) of an abnormal light ray and the refractive index ($n_o$) of a normal light ray, and m is any integer.

For example, where the wavelength $\lambda$ is $\lambda = 680$ nm, the refractive index $n_e$ of the abnormal light ray is $n_e = 1.5509$ and the refractive index $n_o$ of the normal light ray is $n_o = 1.5419$ and therefore, the plate thickness d is $(2m+1) \times 18.9$ ($\mu$m).

For example, when the value of the integer m is $m = 0$, the plate thickness d is as small as the order of 18.9 $\mu$m, and this becomes considerably difficult in manufacturing and holding. Generally the integer m is given any value and the plate thickness d is adjusted so as to be of the order of 1 mm.

Therefore, where as in the present embodiment, a light beam enters the quarter wavelength plate at an angle off the axis, the optical path length l when the off-axis light beam passes through the quarter wavelength plate is $$l = n_o d / \sqrt{n_o^2 - \sin^2\theta} ,$$

where $\theta$ is the angle of incidence at which the light beam is incident on the quarter wavelength plate, and as a result, deviation of the phase occurs off the axis by $(n_o / \sqrt{n_o^2 - \sin^2\theta} - 1) d \cdot \Delta n$. For example, when the plate thickness d is $d = 1$ mm and the angle of incidence $\theta$ is $\theta = 34°$, the phase difference off the axis deviates by $0.9668\lambda \simeq \lambda$ as compared with that on the axis, and it is difficult to separate the light beam off the axis.

Generally in the optical system of a scanning optical apparatus such as a laser printer, it is necessary that the difference between the quantity of light on the axis and the quantity of light off the axis be set to the order of several %, and from this, the allowable phase difference off the axis is $0.0125\lambda$ or less and the plate thickness d is 12.9 $\mu$m or less when the difference is quantity of light is e.g. 5%.

Accordingly, it is not very preferable that the quarter wavelength plate thus formed be applied to a scanning optical apparatus such as a laser printer.

So, in the present embodiment, as shown in FIG. 9, the quarter wavelength plate is effectively formed by two crystal plates being cemented together, thereby solving the aforementioned problem.

In FIG. 9, two crystal plates 109a and 109b are cemented together in such a manner that their crystal axes are orthogonal to each other, and each element is set so that the thicknesses $d_1$ and $d_2$ of the respective crystal plates may be $$d_1 = d \text{ and}$$

$$d_2 = d + (2m+1) \cdot \lambda/4 \cdot \Delta n,$$

whereby the action as a proper quarter wavelength plate is provided.

Also, the optical path difference $\Delta OPD$ between the wave surface of the light beam incident at an angle $\alpha$ from the y-axis and at an angle $\theta$ from the x-axis as shown in FIG. 9 which is polarized on the xz plane and the wave surface of said light beam which is polarized on the xy plane is expressed by $$\Delta OPD = (1 - \tan^2\theta_o \cos^2\alpha)(2m + 1) \cdot \lambda/4 \cdot \cos\theta_o - \Delta n(\sin^2\theta_o \cdot \cos 2\theta_o / \cos^3\theta_o) \cdot d \cdot \cos 2\alpha, \quad (2)$$

where $\sin\theta = n_o \cdot \sin\theta_o$.

Also, if here, the scanning direction is set so as to form an angle of 45° with respect to the crystal axis of the quarter wavelength plate, the equation (2) above is equal to the case of $\alpha = 45°$ and the optical path difference $\Delta OPD$ is $$\Delta OPD = (1 - \tfrac{1}{2} \cdot \tan^2\theta_o)(2m+1) \cdot \lambda/4 \cdot \cos\theta_o. \quad (3)$$

This means that if the difference between the thicknesses of the two crystal plates 109a and 109b is set in such a manner as to provide a phase of $\lambda/4$, i.e., to $\lambda/4 \cdot \Delta n$, even if the thickness d is commonly added to the plate thicknesses of the respective crystal plates, the optical path difference will not vary throughout the entire angle of field and the quarter wavelength plate can be set to any thickness for which manufacturing and holding is easy.

Also, from the aforementioned equation (3), it follows that when the light beam enters the quarter wavelength plate, for example, at the angle of incident $\theta = 45°$, if the integer m is $m = 0$, the optical path difference $\Delta OPD$ will be of the order of $0.99179 \times \lambda/4$ with a result that the optical path difference on the axis and off the axis can be rendered into the order of 1.3%.

Accordingly, the quarter wavelength plate thus formed becomes well applicable to a scanning optical apparatus such as a laser printer.

Thus, in the present embodiment, as previously described, two crystal plates are cemented together to form a quarter wavelength plate, whereby the quarter wavelength plate is relatively good in the manufacturing property and holding property thereof and the incident light beam and the emergent light beam can be accurately separated from each other.

Also, crystal equivalent to $\lambda/4$ can likewise be cemented to the surface of a conventional glass substrate free of the double refractive property to thereby provide a quarter wavelength plate equal in performance to the aforedescribed quarter wavelength plate.

As described above, the fourth embodiment of the present invention is a scanning optical apparatus in which a rectilinearly polarized light beam emitted from light source means is passed through a quarter wavelength plate by way of a polarizing beam splitter and is made into circularly polarized light thereby, is reflected by a pair of reflecting surfaces of a roof type rotatable polygonal mirror comprising a plurality of pairs of reflecting surfaces provided around a rotatable member, each said pair of reflecting surfaces comprising two reflecting surfaces disposed in opposed relationship with each other so as to be orthogonal to each other, and then is reflected by fixed reflecting means disposed in opposed relationship with said roof type rotatable polygonal mirror, and thereafter is returned to said roof type rotatable polygonal mirror and is again reflected by said pair of reflecting surfaces, and is caused to again enter said polarizing beam splitter as rectilinearly polarized light whose directions of polarization are orthogonal to each other when the light beam enters through said quarter wavelength plate, and the light beam caused to emerge from said polarizing beam splitter in a direction orthogonal to the direction of incidence is directed onto a surface to be scanned and said surface to be scanned is optically scanned by said light beam with the rotation of said roof type rotatable polygonal mirror, characterized in that said quarter wavelength plate comprises at least a plurality of crystals cemented together so that the crystal axes thereof may be orthogonal to each other, and said crystal axes are inclined at an angle of 45° with respect to the scanning direction on said surface to be scanned.

Particularly the fourth embodiment of the present invention is characterized in that when the light beam emitted from said light source means enters said quarter wavelength plate, the direction of polarization of said light beam forms an angle of 0° or 90° with respect to the crystal axes of said crystals.

As described above, according to the fourth embodiment of the present invention, there can be achieved a scanning optical apparatus having a roof type rotatable polygonal mirror and a fixed reflecting mirror and in which a polarizing beam splitter and a quarter wavelength plate are used as optical path separating means for separating the optical paths of the incident light beam and the emergent light beam from each other, said quarter wavelength plate is formed by a plurality of crystals cemented together so that the crystal axes thereof may be orthogonal to each other and is disposed so that said crystal axes may be at 45° with respect to the scanning direction, whereby the scanning optical apparatus is great in plate thickness and good in working property and suffers little from the retardation resulting from polarization in the entire angle of field and can alleviate the loss of the quantity of light.

FIG. 10 is a view showing the construction of a fifth embodiment of the scanning optical apparatus of the present invention in the sub-scanning cross-section thereof.

The fifth embodiment proposes a scanning optical apparatus which, as shown in FIG. 10, uses a beam splitter (a half mirror) as optical path separating means for separating the optical paths of the incident light beam and the emergent light beam from each other.

In FIG. 10, a rectilinearly polarized light beam emitted from a light source enters a collimator lens 72, is condensed in one-dimensional direction (the sub-scanning direction) by cylindrical lens 77, 71 is transmitted through a half mirror 75 and impinges on the reflecting surface 73a of a roof type rotatable polygonal mirror 73.

The incident light beam is then reflected an odd number of times by the roof type rotatable polygonal mirror 73 and a fixed reflecting mirror 74, and again enters the half mirror 75. The light beam which has again entered the half mirror 75 is reflected upwardly as viewed in FIG. 10 by the half mirror 75 and forms the image of image information on a photosensitive drum which is a surface to be scanned, by an fθ lens, not shown.

We claim:

1. A scanning optical apparatus comprising:
   a light source unit;
   a deflector for deflecting a light beam from said light source unit, said deflector having a pair of reflecting surfaces orthogonal to each other;
   a reflecting member having a reflecting surface for reflecting the light beam deflected by said deflector back to said deflector to be deflected again; and
   an optical system for condensing the light beam twice deflected by said deflected on a predetermined surface, wherein said optical system has, with respect to the sub-scanning direction, conjugate points on the reflecting surface of said reflecting member and the predetermined surface.

2. A scanning optical apparatus according to claim 1, wherein said deflector is a rotatable polygonal mirror comprising a pair of reflecting surfaces inclined towards a rotational axis of said rotatable polygonal mirror to each, said pair of reflecting surfaces being arranged orthogonally.

3. A scanning optical apparatus according to clam 2, wherein said reflecting member reflects the light beam from one of said pair of reflecting surfaces back to said one of said pair of reflecting surfaces.

4. A scanning optical apparatus comprising:
   a light source unit;
   a deflector including a rotatable polygonal mirror for deflecting a light beam from said light source unit;
   a reflecting member for reflecting the light beam deflected by said deflector and again returning it to said deflector to be deflected again;
   an optical member disposed between said light source unit and said deflector for separating the light beam from said light source unit and the light beam deflected again by said deflector from each other; and
   an optical system for condensing the twice deflected light beam from said optical member on a predetermined surface.

5. A scanning optical apparatus according to claim 4, wherein said deflector has a pair of reflecting surfaces which are orthogonal to each other.

6. A scanning optical apparatus according to claim 5, wherein said pair of reflecting surfaces are inclined towards a rotational axis of said rotatable polygonal mirror.

7. A scanning apparatus according to claim 6, wherein said reflecting member reflects the light beam reflected from one of said pair of reflecting surfaces back to said one of said pair of reflecting surfaces.

8. A scanning optical apparatus according to claim 4, wherein said optical member comprises a polarizing beam splitter and a quarter wavelength plate.

9. A scanning optical apparatus according to claim 4, wherein said optical system is an fθ optical system.

10. A scanning optical apparatus according to claim 9, wherein said optical member comprises a polarizing beam splitter and a quarter wavelength plate.

11. A scanning optical apparatus according to claim 4, wherein said deflector has a pair of reflecting surfaces orthogonal to each other, and said optical system has, with respect to the sub-scanning direction, conjugate points on the reflecting surface of said reflecting member and the predetermined surface.

12. A scanning optical system according to claim 11, wherein said pair of reflecting surfaces are inclined towards a rotational axis of said rotatable polygonal mirror.

13. A scanning optical apparatus according to claim 12, wherein said reflecting member reflects the light beam reflected from one of said pair of reflecting surfaces back to said one of said pair of reflecting surfaces.

14. A scanning optical apparatus according to claim 11, wherein said optical member comprises a polarizing beam splitter and a quarter wavelength plate.

15. An image recording apparatus comprising:
    a light source unit;
    a deflector including a rotatable polygonal mirror for deflecting a light beam from said light source unit;
    a reflecting member for reflecting the light beam deflected by said deflector and again returning it to said deflector to be deflected again;
    an optical member disposed between said light source unit and said deflector for separating the light beam from said light source unit and the light beam again deflected by said deflector from each other;
    an optical system for condensing the twice deflected light beam from said optical member; and
    a photosensitive member for receiving the light beam condensed by said optical system.

16. An image recording apparatus according to claim 15, wherein said deflector has a pair of reflecting surfaces which are orthogonal to each other.

17. An image recording apparatus according to claim 16, wherein said deflector is a rotatable polygonal mirror.

18. An image recording apparatus according to claim 17, wherein said reflecting member reflects the light beam reflected from one of said pair of reflecting surfaces and returns it back to said one of said pair of reflecting surfaces.

19. An image recording apparatus according to claim 15, wherein said optical member comprises a polarizing beam splitter and quarter wavelength plate.

20. An image recording apparatus according to claim 15, wherein said optical system is an fθ optical system.

21. An image recording apparatus according to claim 20, wherein said optical member comprises a polarizing beam splitter and a quarter wavelength plate.

22. An image recording apparatus according to claim 15, wherein said deflector has a pair of reflecting surfaces orthogonal to each other, said reflecting member has a reflecting surface for reflecting the light beam deflected by said deflector back to said deflector, said photosensitive member has a surface for receiving the condensed light beam, and said optical system has, with respect to the sub-scanning direction, conjugate points on the reflecting surface of said reflecting member and the surface of said photosensitive member.

23. An image recording apparatus according to claim 22, wherein said pair of reflecting surfaces are inclined towards a rotational axis of said rotatable polygonal mirror.

24. An image recording apparatus according to claim 23, wherein said reflecting member reflects the light beam reflected from one of said pair of reflecting surfaces back to said one of said pair of reflecting surfaces.

25. An image recording apparatus according to claim 22, wherein said optical member comprises a polarizing beam splitter and quarter wavelength plate.

26. An image recording apparatus comprising:
 a light source unit;
 a deflector for deflecting a light beam from said light source, said deflector having a pair of reflecting surfaces orthogonal to each other;
 a reflecting member having a reflecting surface for reflecting the light beam deflected by said deflector back to said deflector to be deflected again;
 a photosensitive member having a surface for receiving the light beam deflected again by said deflector; and
 an optical system for condensing the light beam twice deflected by said deflector on said photosensitive member, wherein said optical system has, with respect to the sub-scanning direction, conjugate points on the reflecting surface of said reflecting member and the surface of said photosensitive member.

27. An image recording apparatus according to claim 26, wherein said deflector is a rotatable polygonal mirror comprising said pair of reflecting surfaces, which are inclined towards a rotational axis of said rotatable polygonal mirror.

28. An image recording apparatus according to claim 27, wherein said reflecting member reflects the light beam reflected from one of said pair of reflecting surfaces back to said one of said pair of reflecting surfaces.

* * * * *

UNITED STATES PATENT AND TRADEMARK OFFICE
CERTIFICATE OF CORRECTION

PATENT NO. : 5,187,606

DATED : February 16, 1993

INVENTOR(S) : KAZUYUKI KONDO, ET AL.

It is certified that error appears in the above-identified patent and that said Letters Patent is hereby corrected as shown below:

COLUMN 5

Line 56, "7b" should read --7b→--.

COLUMN 11

Line 23, "deflected" (second occurrence) should read --deflector--.
   Line 31, "mirror to" should read --mirror,--.
   Line 32, "each," should be deleted.

COLUMN 12

Line 40, "said deflector is a" should read --said pair of reflecting surfaces are inclined towards a rotational axis on said--.

Signed and Sealed this

Fourth Day of January, 1994

*Attest:*

BRUCE LEHMAN

*Attesting Officer*  *Commissioner of Patents and Trademarks*